United States Patent [19]

Honda et al.

[11] Patent Number: 4,913,879

[45] Date of Patent: Apr. 3, 1990

[54] HYDROGEN ABSORBING MODIFIED ZRMN$_2$-TYPE ALLOYS

[75] Inventors: Naojiro Honda; Nobuhiro Furukawa; Shin Fujitani; Ikuo Yonezu, all of Osaka, Japan

[73] Assignee: Sanyo Electric Co., Ltd., Osaka, Japan

[21] Appl. No.: 255,063

[22] Filed: Oct. 7, 1988

[30] Foreign Application Priority Data

Oct. 8, 1987 [JP] Japan .................. 62-252351
Oct. 20, 1987 [JP] Japan .................. 62-262670
Nov. 20, 1987 [JP] Japan .................. 62-291795

[51] Int. Cl.$^4$ .............................. C01B 6/02
[52] U.S. Cl. ...................... 420/434; 420/422; 420/580; 420/900; 423/644; 423/648.1
[58] Field of Search .............. 420/434, 580, 900, 422; 423/644, 648 R

[56] References Cited

U.S. PATENT DOCUMENTS 4,160,014 7/1979 Gamo et al. .................. 423/644
4,163,666 8/1979 Shaltiel et al. .................. 420/900

Primary Examiner—Upendra Roy
Attorney, Agent, or Firm—Darby & Darby

[57] ABSTRACT

Hydrogen absorbing ZrMn2 alloys having MgZn2-type Laves phase structure with its Mn partially substituted by Co and containing Al as an additive and having the composition Zr(Mn1−xCox)y Alz;

Hydrogen absorbing ZrMn2 alloys having MgZn2-type Laves-phase structure with its Mn partially substituted by Co and Zr partially substituted Zr1−wTiw(Mn1−xCox)y Alz; and Hydrogen absorbing alloys formed from ZrMn2 alloy having MgZn2-type Laves-phase structure or from a multicomponent alloy made therefrom by partially substituting the Zr and Mn with some other element, by further adding thereto at least one element or rare earth, Ca, and Mg.

8 Claims, 7 Drawing Sheets

HYDROGEN ABSORBING MODIFIED ZRMN$_2$-TYPE ALLOYS

FIELD OF THE INVENTION

The invention relates to hydrogen absorbing alloys that reversibly absorb and desorb hydrogen.

BACKGROUND OF THE INVENTION

In recent years there have been developed a variety of systems utilizing hydrogen absorbing alloys that can reversibly absorb and desorb hydrogen. Among them are, for example, heat utilization systems using the reaction heat involved in hydrogen absorption and desorption such as heat storage systems and heat pumps, and hydrogen absorbing systems which take advantage of such alloys to absorb a large amount of hydrogen.

Major necessary conditions for a hydrogen absorbing alloy to be used for such systems are that:

(1) The alloy can be easily activated in the initial stage of hydriding reactions;

(2) The alloy has a moderate hydrogen absorption and a desorption pressure at a given operating temperature;

(3) The difference between the hydrogen absorption and desorption pressures required for a reversible absorption-desorption process is small;

(4) The alloy has a great hydrogen absorption capacity.

(5) Inexpensive raw materials are available for the alloy;

(6) The alloy has an excellent durability for repeated hydrogen absorption-desorption cycles (i.e. a long cycle life).

There have been developed various hydrogen absorbing alloys for use with the hydrogen utilization systems as described above, which, depending upon the purpose and the conditions of the application, may be binary alloys such as rare earth-Ni alloys and Zn-Mn alloys, or multicomponent alloys formed from these alloys by partially substituting some of the compositions by some other elements (see for example Japanese Patents Laid Open Nos. 56-15772 and 56-29945; Journal of the Less-Common Metals, 53(1977)117-131)

Of these alloys, a family of rare earth-Ni alloys have been studied actively as promising candidates for the alloys satisfying aforementioned conditions (1) through (4). However, rare earth, which is a major composition, is very costly. In contrast, Zr-Mn alloys having Laves-phase structure are less costly compared with rare earth alloys, which have, however, greater differences between hydrogen absorption and desorption pressures due to hystereses in absorbing/desorbing a given amount of hydrogen, and greater plateaus slopes, i.e. the ratio (natural logarithmic change in pressure)/(change in the amount of the hydrogen absorbed [in wt %]) on the plateaus (which are those regions where the hydrogen absorption and desorption pressures remain substantially constant with the amount of the hydrogen absorbed and desorbed). Consequently, the differences in hydrogen absorption and desorption pressure required in reversible absorption and desorption are undesirably great for these alloys.

Further, with regard to the cycle life stated in Condition (6), Zr-Mn alloys suffer from a disadvantage that the amount of hydrogen absorbed and desorbed diminishes more significantly than rare earth-Ni systems and the hydrogen transfer rate decreases after repeated absorption-desorption processes. This may be attributed to the fact that the alloys are liable to pulverization at the time of hydrogen absorption and desorption and that alloying particles tend to coagulates with each other under the stresses due to the expansion and the contraction following the pulverization of the alloy, and consequently the hydrogen atoms absorbed in the alloy are prevented from smoothly flowing therein, thereby lowering the absorption/desorption reaction rate.

On account of this, the Zr-Mn alloys may greatly lower the efficiency of an application system such as a heat utilization system when used therein over a long period of time.

BRIEF SUMMARY OF THE INVENTION

The invention is directed to solve the above mentioned disadvantages. Therefore, a major object of the invention is to provide hydrogen absorbing alloys having small hydrogen absorption-desorption pressure differences for reversible absorption and desorption of hydrogen, which are thus applicable to a thermal utilization system operable under hydrogen absorption/desorption pressure and at a temperature appropriate for easy manipulations.

Another object of the invention along with the above object is to provide long-life-time hydrogen absorbing alloys, i.e. alloys that exhibit little deterioration in the ability of hydrogen absorption/desorption for repeated hydrogen absorption-desorption cycles, which are thus suitable for durable thermal utilization systems.

A still further object of the invention is to provide highly durable hydrogen absorbing alloys having an improved property, which are free of coagulation of the alloying particles and can maintain stable hydrogen gas flows through the alloy lattices.

The hydrogen absorbing alloys according to the invention have a feature that firstly the alloys have compositions represented by $Zr(Mn_{1-x}Co_x)_y Al_z$ which are obtained from $ZrMn_2$ alloy having $MgZn_2$-type Laves-phase structure by partial substitution of Co for the Mn and by addition of Al thereto.

By adding Al to such a $ZrMn_2$ alloy having $MgZn_2$-type Laves-phase structure in this manner, only the hydrogen absorption pressure lowers and approaches to the hydrogen desorption pressure, so that the pressure difference in the hysteresis decreases. Further, the partial substitution of Co for the Mn will reduce the slopes of the plateaus, which permits the provision of a hydrogen absorbing alloy having a hydrogen absorption/desorption temperature and pressures suitable for its easy manipulations. Therefore the use of such hydrogen absorbing alloy permits the realization of thermal utilization systems e.g. heat pumps, having extremely high thermal efficiencies.

It is preferable in these cases to keep the stoichiometric ratio y, which is the ratio (Mn+Co)/Zr, within the range $1.7 < y < 2.3$ for the reason that the difference between the absorption and the desorption pressure of a hydrogen absorbing alloy having said composition sharply increases with the ratio y for y below 1.7 or above 2.3.

Furthermore, from the point of optimization of hydrogen absorption, it is preferable to have the amount x of the Co substituent in the range $0 < x < 0.5$, and the amount z of Al added in the range $0 < z < 0.15$.

A second feature of the hydrogen absorbing alloys according to the invention is that the alloys have compositions represented by $Zr_{1-w}Ti_w\ (Mn_{1-x}Co_x)_y\ Al_z$ which are formed from $ZrMn_2$ alloy having $MgZn_2$-type Laves-phase structure by partially substituting the Mn by Co, partially substituting Zr by Ti, and by adding Al thereto.

By adding Al to such a $ZrMn_2$ alloy having $MgZn_2$-type Laves-phase structure in this manner, only the hydrogen absorption pressure lowers and approaches to the hydrogen desorption pressure, so that the pressure difference in the hysteresis decreases. Further, the partial substitution of Co for the Mn will reduce the plateau slopes, which permits the provision of a hydrogen absorption/desorption alloy having a hydrogen absorption/desorption temperature and pressures suitable for easy manipulations. Furthermore, by partially substituting the Zr by Ti, the cycle life of the alloy for the hydrogen absorption-desorption cycles is increased. Therefore the use of such hydrogen absorbing alloy permits the realization of thermal utilization systems, e.g. heat pumps, having a relatively low operative temperature and a small plateau pressure difference for stable reversible hydrogen/absorption processes over a long period, and extremely high thermal efficiencies.

It is preferable in these cases to keep the stoichiometric ratio y, or the ratio (Mn+Co)/Zr, in the range $1.7 < y < 2.3$ for the reason that, for a hydrogen absorbing alloy having the above mentioned composition the difference between the absorption and the desorption pressure sharply increases for y below 1.7 or above 2.3.

Furthermore, from the point of optimization of hydrogen absorption, it is preferable to have the amount w of the Ti substituent in the range $0 < w < 0.5$, Co substituent in the range $0 < x < 0.5$, and the amount z of Al additive in the range $0 < z < 0.15$.

A third feature of the hydrogen absorbing alloys according to the invention is that they are formed from $ZrMn_2$ alloy having $MgZn_2$-type Laves-phase structure or from a multicomponent alloy made therefrom by the partially substituting the Zr and Mn by some other elements, and further adding thereto at least one element of rare earth, Ca, or Mg.

By adding to such hydrogen absorbing alloy having $MgZn_2$-type Laves-phase structure forming the major matrix at least one quite easily oxidizable element of rare earth, Ca, and Mg, minute oxidized particles of such element are formed at the time of pulverization of the alloy before the activation treatment, and diffuse uniformly in the hydrogen absorbing matrix after the activation treatment through repeated absorption-desorption processes, serving as "cushions" between the pulverized alloying particles to prevent the coagulation of the alloying particles and to maintain stable flow of the hydrogen absorbed in the matrix.

It is noted that the rare earth metals, Ca, and Mg to be added in the alloy result in extremely stable oxides as understood from the so-called Ellingham diagram representing the relationship between the standard free energy of an oxide and the temperature. These oxides are not reduced below 1000° C. even in a highly pure hydrogen gas of about 7N. Therefore, the effect of said oxides on alloying particles which would otherwise coagulate will not be lost with the presence of hydrogen.

It is preferable from the point of reaction rate and of hydrogen transfer rate that the amount of the rare earth metals, Ca, and Mg to be added in the hydrogen absorbing alloys is suppressed equal to or less than 5 wt %.

BRIEF DESCRIPTION OF THE INVENTION

FIG. 1 compares the equilibrium hydrogen pressure-absorbed hydrogen characteristics for conventional alloys (FIGS. 1(a) and (b)) and for the alloy of Embodiment 1 according to the invention (FIG. 1 (c)).

Figure 6:
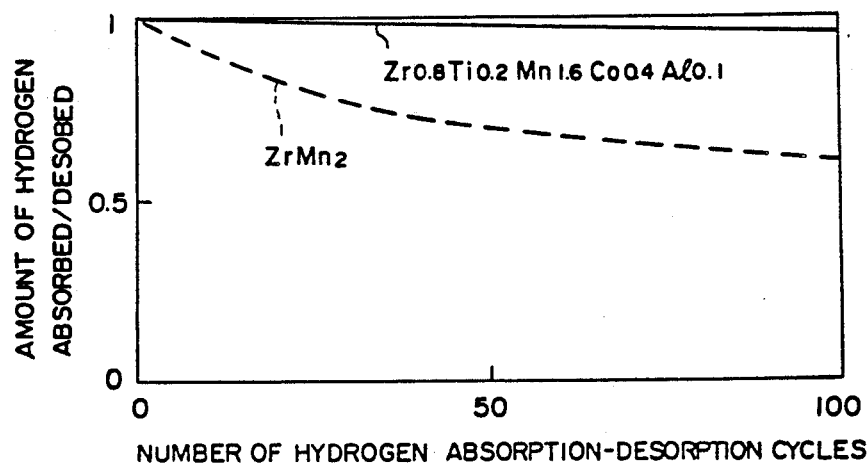

FIG. 6 compares the characteristics of hydrogen absorption-desorption cycle life of a prior art alloy with that of the hydrogen absorbing alloy of Embodiment 4.

Figure 7:
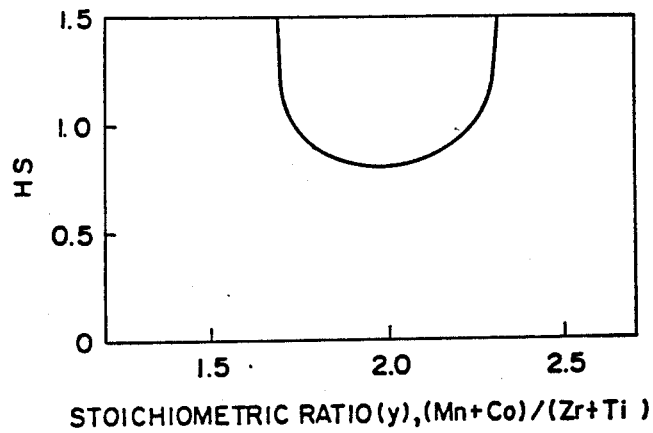

FIG. 7 is a graph showing the relationship between the stoichiometric ratio y of the alloy having the composition $Zr_{0.8}Ti_{0.2}(Mn_{0.8}Co_{0.2})_y Al_{0.2}$ formed in Embodiment 5 and the logarithmic pressure difference in a reversible hydrogen absorption-desorption process.

Figure 8:
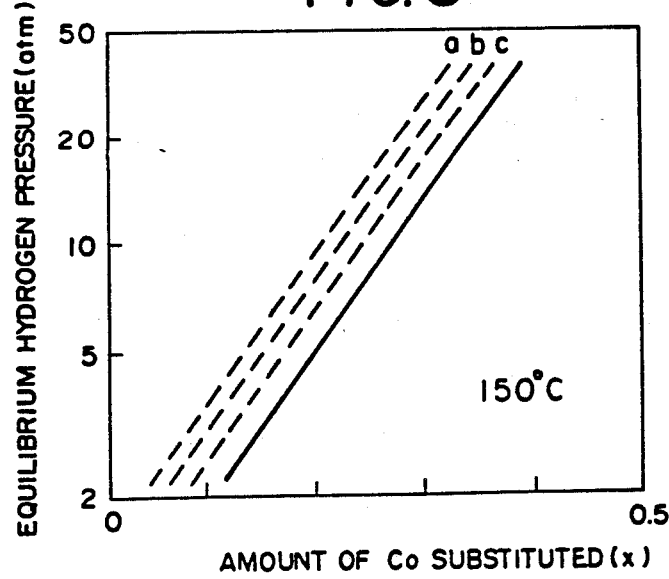

FIG. 8 is a graph showing the relationships among the amount z of Al added, the amount x of the substituent Co of the alloys of Embodiment 6 having the composition $Zr_{0.8}Ti_{0.2}(Mn_{1-x}Co_x)_2 Al_z$ and the hydrogen absorption/desorption pressure.

Figure 9:
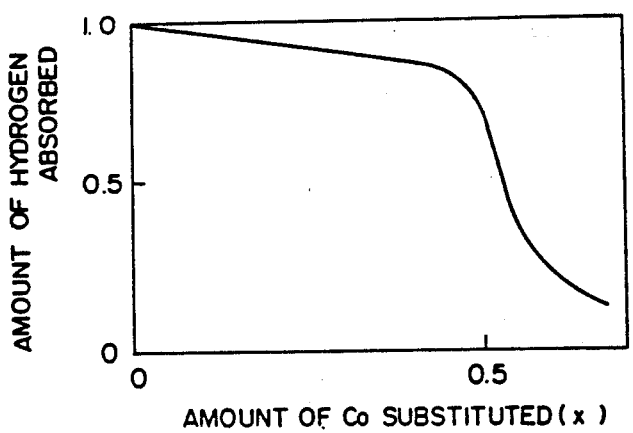

FIG. 9 is a graph showing the relationship between the amount x of the substituent Co and the amount of the hydrogen absorbed in the alloy of Embodiment 6 having the composition $Zr_{0.8}Ti_{0.2}(Mn_{1-x}Co_x)_2Al_{0.1}$.

Figure 10:
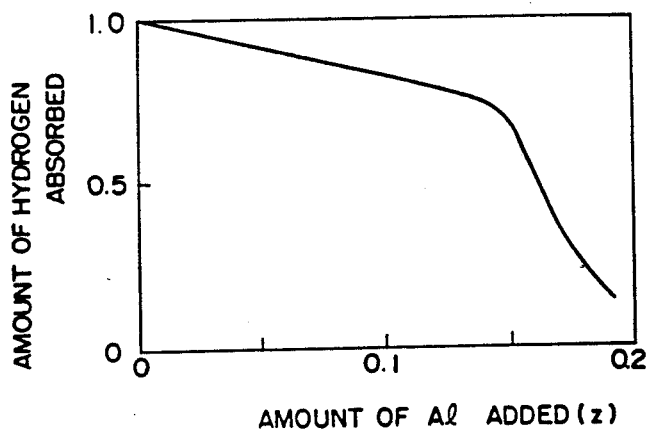

FIG. 10 is a graph showing the relationship between the amount z of the Al added and the amount of the hydrogen absorbed in the alloy of Embodiment 6 having the composition $Zr_{0.8}Ti_{0.2}Mn_{1.6}Co_{0.4}Al_z$.

Figure 11:
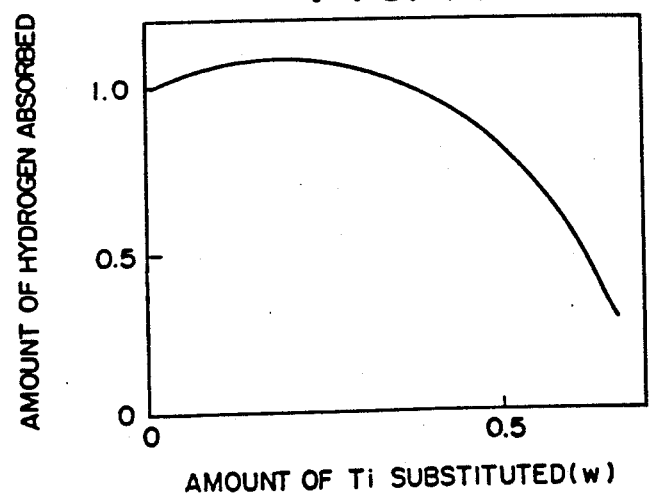

FIG. 11 is a graph showing the relationship between the amount w of the substituent Ti and the amount of the hydrogen absorbed in the alloy of Embodiment 6 having the composition $Zr_{1-w}Ti_wMn_{1.6}Co_{0.4}Al_{0.1}$.

Figure 12:
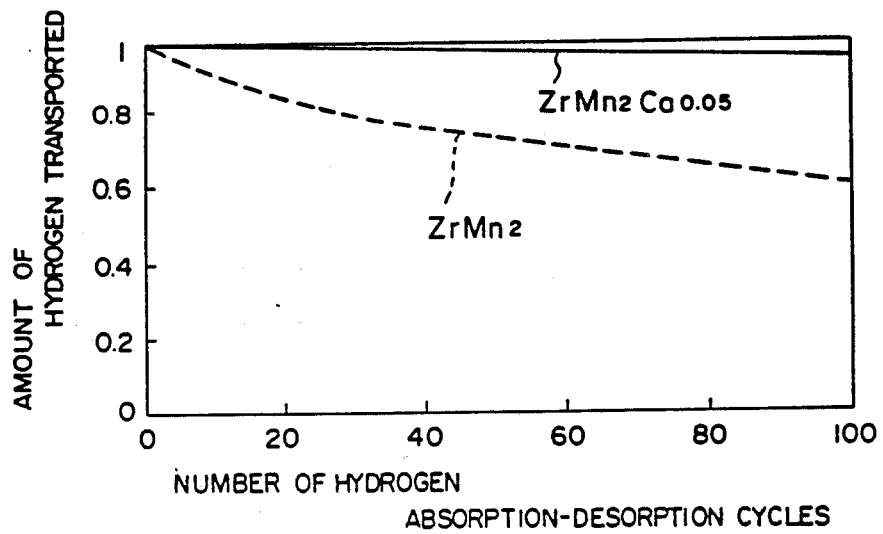

FIG. 12 compares the amount of the hydrogen transferred in a conventional alloy and the alloy according to the invention versus the number of cycles of hydrogen absorption-desorption processes.

Figure 13:
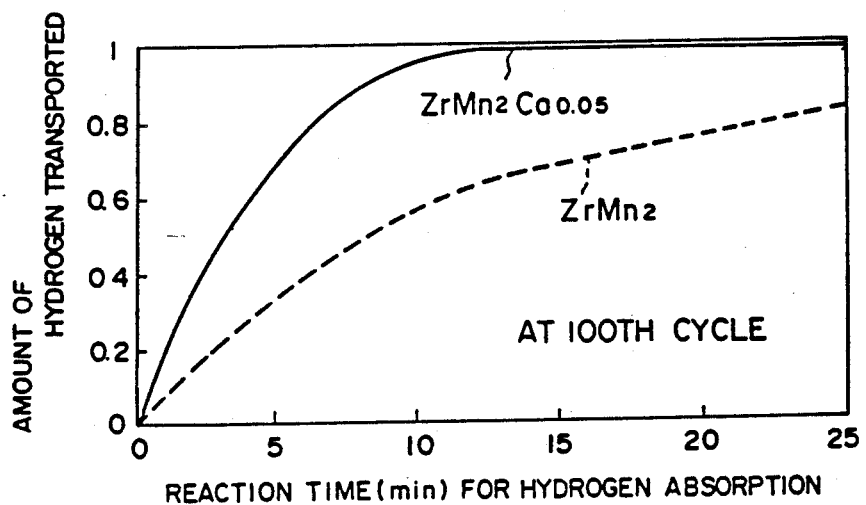

FIG. 13 compares the hydrogen absorption rates of a conventional alloy and the alloy according to the invention at 100th hydrogen absorption-desorption cycle.

Figure 14:
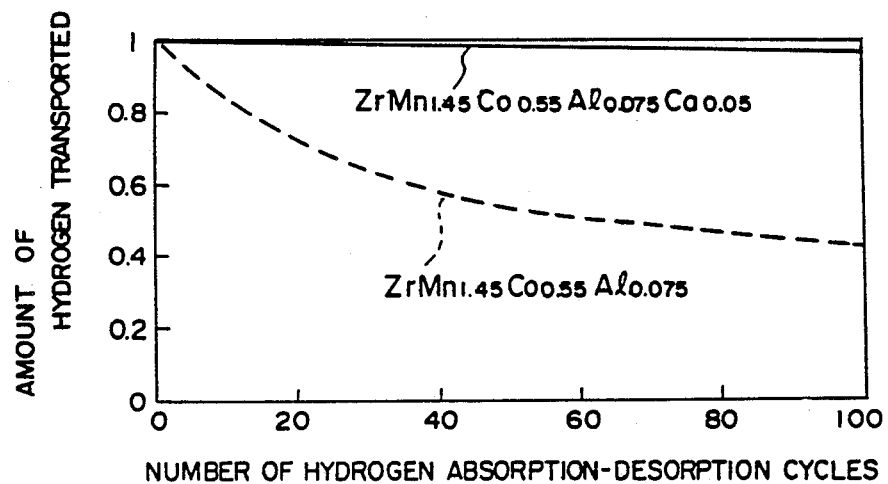

FIG. 14 is a graph showing the relationship between the number of hydrogen absorption-desorption cycles and the amount of the hydrogen transferred in the alloys having the composition $ZrMn_{1.45}Co_{0.55}Al_{0.075}Ca_{0.05}$ and $ZrMn_{1.45}Co_{0.55}Al_{0.075}$.

Figure 15:
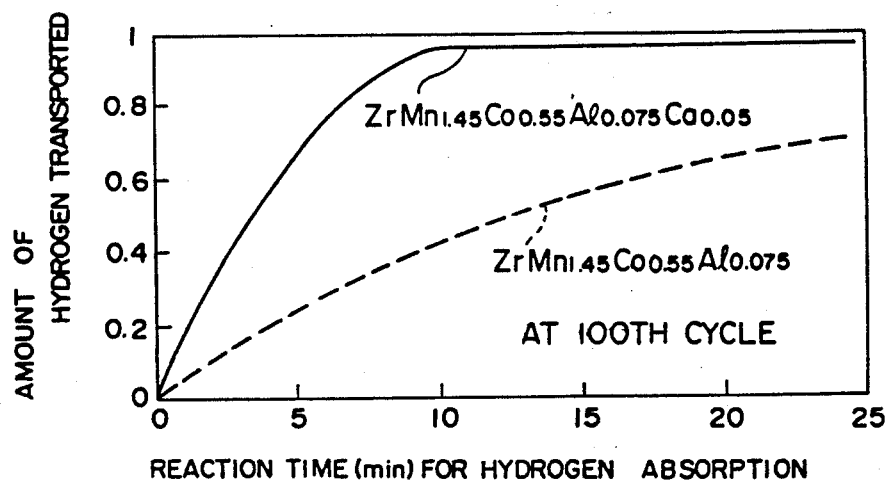

FIG. 15 is a graph showing the relationship between the hydrogen absorbing reaction time and the amount of the hydrogen transferred in the alloys having the composition $ZrMn_{1.45}Co_{0.55}Al_{0.075}Ca_{0.05}$ and $ZrMn_{1.45}Co_{0.55}Al_{0.075}$.

DETAILED DESCRIPTION OF THE PREFERRED EMBODIMENT

Embodiment 1

Proper amounts of Zr, Mn, Co, and Al powders to be used as material metals for the hydrogen absorbing alloy were measured, which were then mixed and pressed into an appropriately sized aggregate, and further cast into a metal block having a composition of $ZrMn_{1.6}Co_{0.4}Al_{0.1}$ after the aggregate was melt by means of argon arc in a water-cooled copper mold. The block was then crushed through a mesh of about 100 to obtain a powder hydrogen absorbing alloy having a composition of $ZrMn_{1.6}Co_{0.4}Al_{0.1}$.

The crystalline structure of this hydrogen absorbing alloy was observed by means of X-ray powder diffractometry and was found to be $MgZn_2$-type Laves-phase single phase structure.

It has been verified that the initial activation of this alloy $Zr Mn_{1.6} Co_{0.4} Al_{0.1}$ is easy and that it promptly begins hydrogen absorption at room temperature in an atmosphere of 10-20 atm hydrogen gas given after the evacuation of the air.

Further, in order to compare the characteristics of the hydrogen absorbing alloy made in this manner with those of conventional hydrogen absorbing alloys, the following alloys were made.

Comparing Alloys 1

In a manner similar to the above Embodiment 1 except that Co and Al were not used, hydrogen absorbing alloy $ZrMn_2$ was made from a powder mixture of material metals Zr and Mn, hydrogen absorbing alloy $Zr_{0.8}Ti_{0.2} Mn_2$ from Zr, Ti, Mn.

Figure 1C:
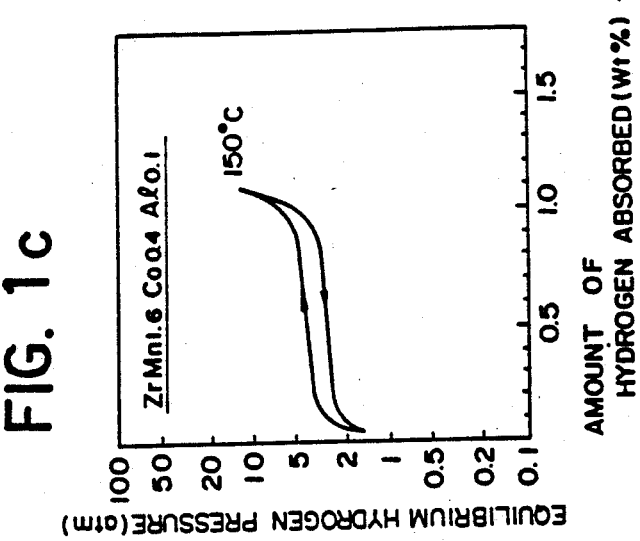
Figure 1B:
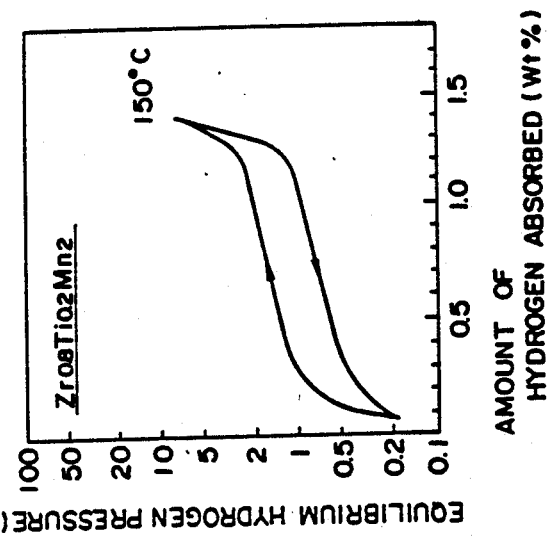
Figure 1A:
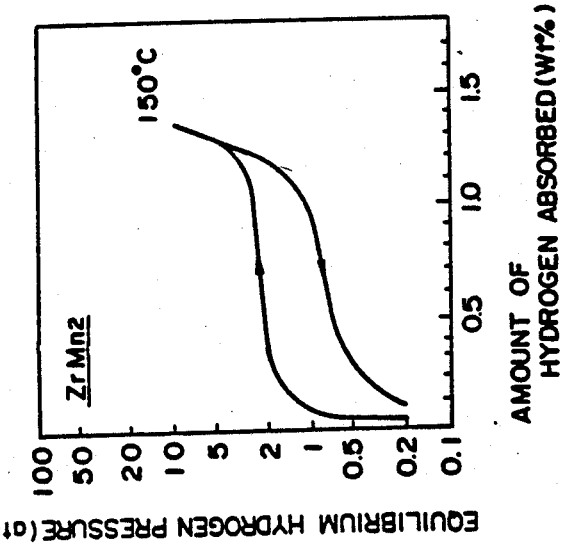

Using a well known Sievelts apparatus the amounts of the hydrogen absorbed at an equilibrium hydrogen pressure at 150° C. were measured for the alloys obtained in the above Embodiment 1 and for Comparing Alloys 1, to study the hydrogen absorption/desorption characteristics thereof, the results of which are shown in FIGS. 1 (a) through (c).

In these Figures, (a) is the curve representing the equilibrium hydrogen pressure versus the amount of the hydrogen absorbed in conventional $ZrMn_2$ alloy, (b) in conventional $Zr_{0.8}Ti_{0.2} Mn_2$ alloy, and (c) in $ZrMn_{1.6}Co_{0.4}Al_{0.1}$ alloy of the Embodiment 1. The rightward arrows in the figures indicate absorption curves, while the leftward arrows indicate desorption curves.

Table 1 summarizes the characteristics of these alloys in a numerical form.

TABLE 1

| Alloys | H | S | HS | Comment |
|---|---|---|---|---|
| $ZrMn_2$ | 1.1 | 0.4 | 1.3 | Conventional alloy |
| $Zr_{0.8}Ti_{0.2}Mn_2$ | 0.8 | 0.8 | 1.4 | Conventional alloy |
| $ZrMn_{1.6}Co_{0.4}Al_{0.1}$ | 0.3 | 0.3 | 0.6 | Embodiment 1 |

In Table 1 the values for H, S, and HS are for 150 C. H represents the difference (in natural logarithm) between the hydrogen absorption pressure and the hydrogen desorption pressure at the midpoint of the respective plateaus; S represents a plateau slope i.e. (natural logarithmic change in pressure)/(change in the amount of the hydrogen absorbed [wt %]); HS represents the pressure difference (in natural logarithm) observed in reversibly absorbing or desorbing the amount of the hydrogen corresponding to 0.7 wt %.

As will be understood from FIG. 1 and Table 1, the $Zr Mn_{1.6}Co_{0.4}Al_{0.1}$ alloy of Embodiment 1 has a smaller logarithmic hysteresis difference between a reversible hydrogen absorption and desorption pressure and a flatter plateau slope than the conventional $ZrMn_2$ and $Zr_{0.8}Ti_{0.2} Mn_2$ alloys.

It is apparent that the above mentioned alloy according to the invention can be formed equally well in other known furnaces such as high frequency induction furnace, though mention has been made in the above Embodiment of the hydrogen absorbing alloy formed in the argon arc furnace.

It is also apparent that, although the powder Zr, Mn, Co, and Al has been used as the material metals in the above Embodiment, any other forms of materials may be used, e.g. in the form of single metals, alloys, or powdered $ZrMn_2$ alloy plus Co, Al, so long as their compositions are known and necessary amount thereof are measured correctly.

Embodiment 2

As in Embodiment 1 in which we have studied the properties of $Zr (Mn_{0.8}Co_{0.2})_2 Al_{0.1}$ alloys, various hydrogen absorbing alloys having the comosition $Zr(Mn_{0.8}Co_{0.2})_y Al_{0.1}$ were formed from Zr, Mn, Co, and Al powders by varying the stoichiometric ratio y or the ratio of (Mn+Co) to Zr.

It has been found as in Embodiment 1 that the crystalline structure of the hydrogen absorbing alloys in this Embodiment is, as revealed by X-ray powder diffractometry, $MgZn_2$ type Laves-phase single-phase structure, that their initial activation is easy and they promptly start hydrogen absorption in a hydrogen gas at room temperature pressurized to 10-20 atm after the evacuation of the air.

Figure 2:
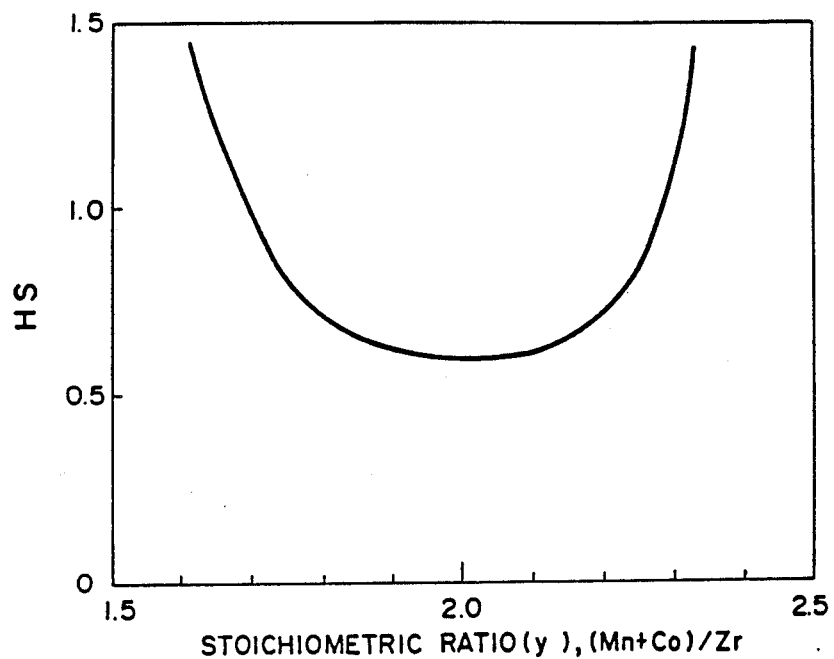
FIG. 2 is a graph showing the relationship between the stoichiometric ratio y of the alloy having the composition $Zr(Mn_{0.8}Co_{0.2})_y Al_{0.1}$ formed in Embodiment 2 and the logarithmic difference between the hydrogen absorption pressure and the desorption pressure for a reversible hydrogen absorption/desorption process.

Further, absorption/desorption characteristics of these alloys were studied, from which we have obtained the following relationship between the stoichiometric ratio y and the pressure difference HS (in natural logarithm) observed in reversibly absorbing/desorbing 0.7 wt % of hydrogen, as shown in FIG. 2.

It is evident from this Figure that the above pressure difference HS increases sharply with the stoichiometric ratio y if y is less than 1.7 or greater than 2.3. This is due to the fact that the slopes of the plateaus increases when the stoichiometric ratio y is less than 1.7, and that, for y greater than 2.3, the slopes of the plateaus increases and the amount of the hydrogen absorbed decreases.

Embodiment 3

As in Embodiment 1, various hydrogen absorbing alloys represented by $Zr (Mn_{1-x}Co_x)_2 Al_z$ were formed from Zr, Mn, Co, and Al powders by varying the amount x of Co substituent for Mn and the amount z of Al added, for which the hydrogen absorption/desorption characteristics have been studied for different degrees of x and z.

It has been found as in the Embodiment 1 that these hydrogen absorbing alloys also have $MgZn_2$ type Laves-phase single-phase structure, that their initial activation is easy and they promptly start hydrogen absorption in a hydrogen gas at room temperature pressurized to 10-20 atm after the evacuation of the air.

Figure 3:
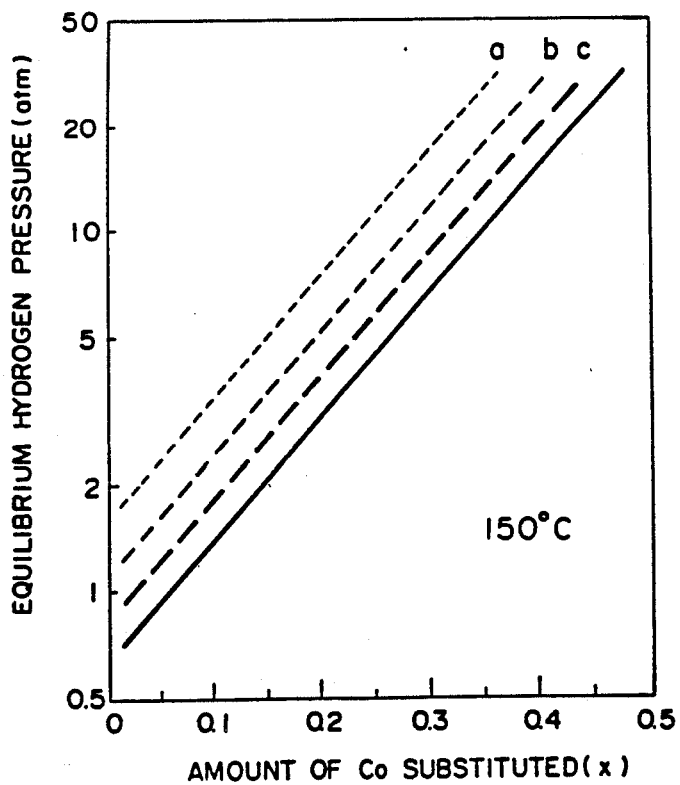
FIG. 3 is a graph showing the relationships among the amount z of Al added, the amount x of the substituent Co in the alloy having the composition $Zr(Mn_{1-x}Co_x)_2\ Al_z$ and the hydrogen absorption/desorption pressure.

FIG. 3 shows the relationships among the amount x of Al added and z of substituent Co of the $Zr(Mn_{1-x}Co_x)_2 Al_z$ alloy, and the hydrogen absorption/desorption pressure. In this figure, the solid line represents the relationship between the substituted amount x and the equilibrium hydrogen desorption pressure, while the phantom lines a, b, c represent the relationship between the amount x of the substituent Co and the equilibrium hydrogen absorption pressure for z=0, 0.05, and 0.1, respectively. It is seen from this Figure that only the hydrogen absorption pressure decreases as the amount of the Al added is increased, resulting in the reduction of the hysteresis. It is also seen that regardless the amount z of Al added the logarithmic hydrogen absorption/desorption pressure increases linearly with the amount x of the substituent Co.

Figure 4:
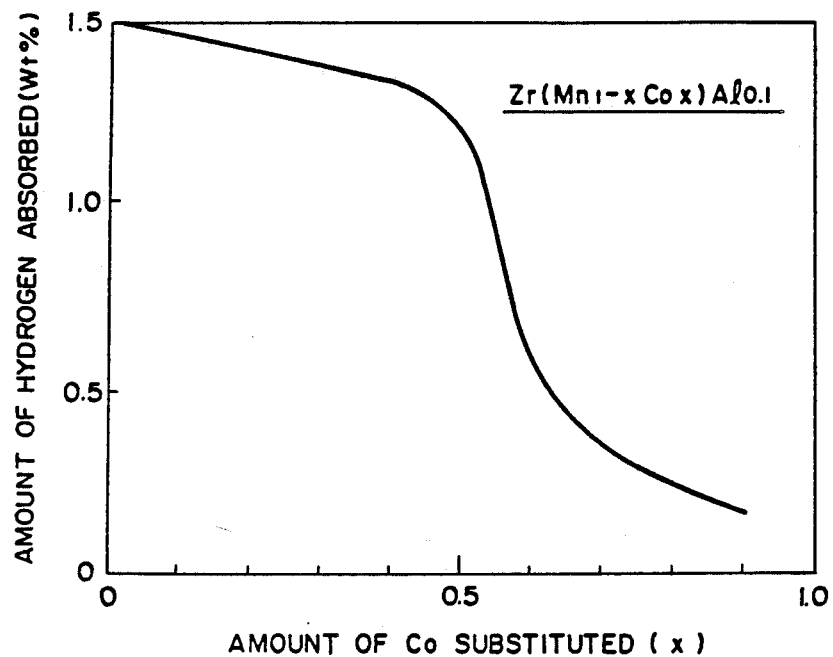
FIG. 4 is a graph showing the relationship between the amount x of the substituent Co and the amount of the hydrogen absorbed in the alloy of Embodiment 3 having the composition $Zr(Mn_{1-x}Co_x)_2\ Al_{0.1}$.

FIG. 4 shows the relationship between the amount x of the Co substituent in the $Zr(Mn_{1-x}Co_x)_2 Al_{0.1}$ alloy and the the amount of the hydrogen absorbed for the case of z=0.1. It is apparent from the Figure that the absorbed amount of the hydrogen sharply decreases for x above 0.5.

Figure 5:
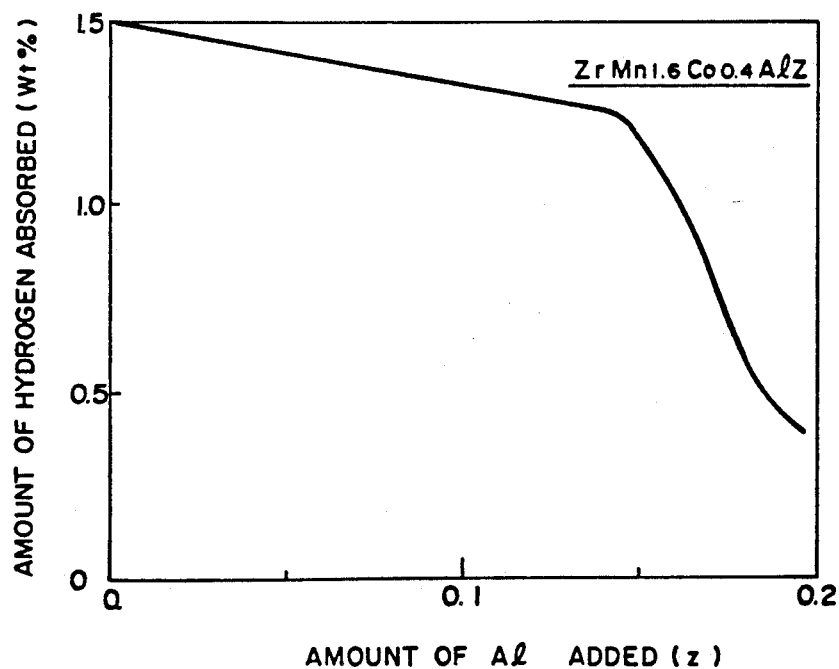
FIG. 5 is a graph showing the relationship between the amount z of the Al added and the amount of the hydrogen absorbed for the alloy of Embodiment 3 having the composition $ZrMn_{1.6}Co_{0.4}Al_z$.

FIG. 5 shows the relationship between the amount z of the Al added in the $ZrMn_{1.6} Co_{0.4} Al_z$ alloy and the the amount of the hydrogen absorbed for the case x=0.2. It is apparent from the Figure that the absorbed amount of the hydrogen sharply decreases with z greater than 0.15.

It is seen from these examples that the addition of Al to conventional $ZrMn_2$ alloys having $MgZn_2$-type Laves-phase structure will reduce the hysteresis which is the major source of the difference between the hydrogen absorption and the desorption pressure required for a reversible hydrogen absorption and desorption. Furthermore, the partial substitution of Co for Mn of this Al-added $ZrMn_2Al_z$ alloy to form alloys having the composition $Zr(Mn_{1-x}Co_x)_yAl_z$, makes it possible to reduce the slopes of the plateaus and control the plateau pressures, especially in the case where the amount x of Co substituent, stoichiometric ratio y of (Mn+Co) to Zr, and the amount x of Al added are chosen to be within the respective ranges below:

$$0<x<0.5, \ 1.7<y<2.3, \ 0<z<0.15, \ 0<w<0.5.$$

Consequently, it is possible to obtain an alloy suitable for use with thermal utilization systems, since the alloy permits easily manipulable, reversible hydrogen absorption-desorption cycles with a small pressure difference at a temperature in the range of 100–200 C.

Embodiment 4

Following the same procedure as in Embodiment 1, and using measured Ti, Zr, Mn, Co, and Al powders as material metals, a powder hydrogen absorbing alloy having the composition $Zr_{0.8} Ti_{0.2}Mn_{1.6} Co_{0.4}Al_{0.1}$ was formed.

It has been confirmed from X-ray powder diffractometry that this hydrogen absorbing alloy has an $MgZn_2$-type Laves-phase single-phase structure.

The initial activation of this $Zr_{0.8} Ti_{0.2}Mn_{1.6} Co_{0.4}Al_{0.1}$ alloy is easy, and it starts promptly absorption of hydrogen in a hydrogen gas pressurized to 10–20 atm at room temperature after the evacuation of the air.

In order to compare the properties of this alloy with the conventional hydrogen absorbing alloys, the following alloys were formed.

Comparing Alloys 2

In a manner similar to the above example, a hydrogen absorbing alloy $ZrMn_2$ was made from a powder mixture of material metals Zr and Mn; a hydrogen absorbing alloy $Zr_{0.8}Ti_{0.2} Mn_2$ from Zr, Ti, Mn; and a $ZrMn_{1.6}Co_{0.4}$ alloy from Zr, Mn, Co.

Using a well known Sievelts apparatus isotherms for equilibrium hydrogen pressure-absorbed amount of hydrogen at 150° C. have been measured for the alloys obtained in the above Embodiment 4 and the Comparing Alloys 2, from which the hydrogen absorption/desorption characteristics and the cycle life for the hydrogen absorption-desorption cycles have been examined.

Table 2 lists in a numerical form the results obtained from the equilibrium hydrogen pressure-absorbed hydrogen curves.

TABLE 2

| Alloys | H | S | HS | Comment |
|---|---|---|---|---|
| $ZrMn_2$ | 1.1 | 0.4 | 1.3 | Conventional alloy |
| $Zr_{0.8}Ti_{0.2}Mn_2$ | 0.8 | 0.8 | 1.4 | Conventional alloy |
| $ZrMn_{1.6}Fe_{0.4}$ | 0.8 | 0.8 | 1.4 | Conventional alloy |
| $Zr_{0.8}Ti_{0.2}Mn_{1.6}Co_{0.4}Al_{0.1}$ | 0.4 | 0.7 | 0.8 | This invention |

In Table 2 H, S, and HS represent the same quantities as in Table 1, respectively. It will be understood from the Table that, in comparison with the conventional $ZrMn_2$, $Zr_{0.8}Ti_{0.2} Mn_2$, and $ZrMn_{1.6}Fe_{0.4}$ alloys, the $Zr_{0.8}Ti_{0.2} Mn_{1.6}Co_{0.4} Al_{0.1}$ alloy of this Embodiment has a smaller hysteresis or a smaller plateau slope, and hence has a smaller pressure difference (in natural logarithm) for a reversible hydrogen absorption-desorption process.

Table 3 lists numerically the cycle life of the alloy obtained in the Embodiment 4 and those of Comparing Alloys 2 for hydrogen absorption-desorption cycles. It is seen in this Table that the amount of the hydrogen that can be absorbed and desorbed by the $Zr_{0.8}Ti_{0.2} Mn_{1.6}Co_{0.4} Al_{0.1}$ alloy of this invention is maintained to 95% of the initial amount even after 100 cycles of absorption and desorption, verifyng that it has an excellent cycle life characteristic for the cycles compared with the conventional $ZrMn_2$, $Zr_{0.8}Ti_{0.2} Mn_2$, and $ZrMn_{1.6}Fe_{0.4}$ alloys.

TABLE 3

| Alloys | Amount of Hydrogen Absorbed/Desorbed* | Comment |
|---|---|---|
| $ZrMn_2$ | 0.60 | Conventional alloy |
| $Zr_{0.8}Ti_{0.2}Mn_2$ | 0.80 | Conventional alloy |
| $ZrMn_{1.6}Fe_{0.4}$ | 0.70 | Conventional alloy |
| $Zr_{0.8}Ti_{0.2}Mn_{1.6}Co_{0.4}Al_{0.1}$ | 0.95 | This invention |

*Ratio to the amount of the hydrogen initially absorbed/desorbed after 100 cycles.

FIG. 6 shows the variation of the amount of the hydrogen absorbed/desorbed with the frequency of the absorption-desorption cycles for a typical prior art $ZrMn_2$ alloy and for $Zr_{0.8}Ti_{0.2} Mn_{1.6}Co_{0.4} Al_{0.1}$ alloy according to the invention. It is seen from the Figure that the amount of the hydrogen absorbed/desorbed by the $Zr_{0.8}Ti_{0.2} Mn_{1.6}Co_{0.4}Al_{0.1}$ alloy according to the invention (solid line) is substantially the same as the initial amount over 100 cycles, indicating that the alloy is a stable system.

Embodiment 5

In the same manner as in Embodiment 1 various hydrogen absorbing alloys represented by $Zr_{0.8}Ti_{0.2}$ $(Mn_{0.8}Co_{0.2})_y Al_{0.1}$ were formed from Ti, Zr, Mn, Co, and Al powders by varying the relative composition of (Zr+Ti) to (Mn+Co), where y is the stoichiometric ratio of (Zr+Ti) to (Mn+Co).

It has been found as in Embodiment 4 that the hydrogen absorbing alloys in this Embodiment have a crystalline structure of $MgZn_2$ type Laves-phase single-phase structure as revealed by X-ray powder diffractometry, and that their initial activation is easy and they promptly start hydrogen absorption in a hydrogen gas at room temperature pressurized to 10–20 atm after the evacuation of the air.

Further, absorption/desorption characteristics of these alloys were studied, from which the following relationship between the stoichiometric ratio y and the pressure difference (in natural logarithm) HS observed in reversibly absorbing/desorbing 0.7 wt % of hydrogen have been obtained, which is shown in FIG. 7.

It is evident from this Figure that said pressure difference HS increases sharply with the stoichiometric ratio y in the range of y<1.7 or y>2.3. This is due to the fact that the slopes of the plateaus increase when the stoichiometric ratio y is less than 1.7, and that, for y greater than 2.3, the slopes of the plateaus increase and the amount of the hydrogen absorbed decrease.

Embodiment 6

In the same manner as in the Embodiment 4, various hydrogen absorbing alloys represented by $Zr_{1-w}Ti_w(Mn_{1-x}Co_x)_2 Al_z$ have been formed from Ti, Zr, Mn, Co, and Al powders, for which the hydrogen absorption/desorption characteristics have been studied by varying the amount x of Co substituent for Mn, and the amount w of Ti substituent for Zr.

It has been found, as in Embodiment 4, that the hydrogen absorbing alloys in this Embodiment have a crystalline structure of $MgZn_2$ type Laves-phase single-phase structure as revealed by X-ray powder diffractometry, that their initial activation is easy and they promptly start hydrogen absorption in a hydrogen gas at room temperature pressurized to 10–20 atm after the evacuation of the air.

FIG. 8 shows the relationships among the hydrogen absorption/desorption pressure, the amount z of Al added, and the amount x of substituent Co of the $Zr_{0.8}Ti_{0.2}(Mn_{1-x}Co_x)_2 Al_z$ alloy. In this Figure, the solid line represents the relationship between the substituted amount x and the equilibrium hydrogen desorption pressure, while the phantom lines a, b, c represent the relationship between the amount x of the substituent Co and the equilibrium hydrogen absorption pressure for cases with z=0, 0.05, and 0.1. It is seen from this figure that only hydrogen absorption pressure decreases with the increase in the added Al amount and the hysteresis becomes smaller. It is also seen that regardless the amount z of Al added the logarithmic hydrogen absorption/desorption pressure increases linearly with the amount x of the substituent Co.

FIG. 9 shows the relationship between the amount x of the Co substituent in the $Zr_{0.8}Ti_{0.2}(Mn_{1-x}Co_x)_2 Al_z$ alloy and the the amount of the hydrogen absorbed for cases with z (the amount of Al added)=0.1 and w (the amount of substituent Ti)=0.2. In this figure the amount of the absorbed hydrogen is shown in the ratio relative to the amount of the hydrogen for which x (amount of Co substituent)=0. As it is aparent from the Figure, the amount of the hydrogen absorbed sharply decreases for x>0.5.

FIG. 10 shows the relationship between the amount z of the Al added in the $Zr_{0.8}Ti_{0.2}Mn_{1.6}Co_{0.4}Al_z$ alloy and the amount of the hydrogen absorbed for cases with x (the amount of Co substituent)=0.2 and w (the amount of Ti substituent)=0.2. In this figure the amount of the absorbed hydrogen is shown in the ratio relative to the amount for which z (Al amount added)=0. The figure indicates that the amount of the hydrogen absorbed sharply decreases substantially for z>0.15.

FIG. 11 shows the relationship between the amount of the hydrogen absorbed and the amount w of the Ti substituent in the $Zr_{1-w}Ti_wMn_{1.6}Co_{0.4}Al_{0.1}$ alloy for the case with x (the amount of Co substituent)=0.2 and z (the amount of added Al)=0.1. In this Figure the amount of the absorbed hydrogen is shown in the ratio relative to that for which w (amount of Ti substituent)=0. The figure indicates that the amount of the absorbed hydrogen becomes maximum in the neighborhood of w (amount of Ti substituent)=0.2, and sharply decreases for w>0.5. It is seen from these examples that the addition of Al to conventional $ZrMn_2$ alloys having $MgZn_2$-type Laves-phase structure will make the hysteresis smaller. Further, the partial substitution of Co for the Mn and the partial substitution of Ti for the Zr in this Al added $ZrMn_2Al_z$ alloy to form the alloy having the composition $Zr_{1-w}Ti_w(Mn_{1-x}Co_x)_y Al_z$, will reduce the plateau slopes and make smaller the hysteresis, permit control of the plateau pressures, and give a longer cycle life for the absorption-desorption cycles than the conventional alloys, especially in the case where w (amount of Ti substituent), x (amount of Co substituent), y (stoichiometric ratio of (Mn+Co) to (Zr+Ti)), and z (Al amount added) are chosen to be within the respective ranges below:

$$0<x<0.5,\ 1.7<y<2.3,\ 0<z<0.15,\ 0<w<0.5.$$

Consequently, the alloy permits a stable, long-life hydrogen absorption/desorption with a small manipulable pressure difference at a temperature in the range of 100°–200° C., and hence can be used as an adequate hydrogen absorbing alloy in a thermal utilization system.

Embodiment 7

In order to compare with conventional $ZrMn_2$ alloy the hydrogen absorbing alloys each containing one of Ca, Mg, La, or Mm (misch-metals), mixtures composed of well mixed powder material metals of Zr and Mn to which one powder element of Ca, Mg, La, and Mm was added in three different atomic proportions 1:2:0.05 were prepared. These powder mixtures composed of (Zr, Mn, Ca), (Zr, Mn, Mg), (Zr, Mn, La), and (Zr, Mn, Mm) are each pressed into blocks of appropriate size and, in the same manner as in Embodiment 1, cast into powder alloys having the compositions $ZrMn_2Ca_{0.05}$, $ZrMn_2Mg_{0.05}$, $ZrMn_2La_{0.05}$, and $ZrMn_2Mm_{0.05}$, respectively.

After they are exposed to the air at room temperature for several hours, the powder hydrogen absorbing alloys are introduced in respective reactors to the depth of about 2 cm, and subjected to initial activation treatments. By varying the temperature of the reactors alternately between 180° C. and 50° C., hydrogen absorption and desorption processes (each process consisting of 10 min absorption and 10 min desorption) are repeated for the alloys. The amount of the hydrogen transferred accompanying the processes and the hydrogen transfer rate (or reaction rate) were measured, the results of which are listed in Table 4 and graphically shown in FIGS. 12 and 13.

TABLE 4

| Alloys | Amount of hydrogen transferred after 100 cycles (ratio to the hydrogen transfer immediately after the activation) | Comment |
|---|---|---|
| $ZrMn_2$ | 0.60 | conventional |
| $ZrMn_2Ca_{0.05}$ | 0.96 | this invention |
| $ZrMn_2Mg_{0.05}$ | 0.93 | this invention |
| $ZrMn_2La_{0.05}$ | 0.97 | this invention |
| $ZrMn_2Mm_{0.05}$ | 0.97 | this invention |

Table 4 represents the ratio of the amount of hydrogen transferred after 100 cycles of absorption-desorption to that immediately after the activation. It can be seen from this Table that the alloys formed of $ZrMn_2$ to which is added Ca, Mg, La, and Mm, respectively, in accordance to the invention still maintain more than 90% of the initially transferred hydrogen, while the conventional $ZrMn_2$ alloy maintains only about 60%.

FIG. 12 shows the change in the amount of transferred hydrogen with the number of absorption-desorption cycles for the conventional $ZrMn_2$ alloy and $ZrMn_2Ca_{0.05}$ alloy of this Embodiment, in which the solid line is for the invention and the phantom line for the conventional alloy. The amount of the transferred hydrogen is indicated by the ratio to that immediately after the activation. It can be seen from the Figure that, compared with the conventional $ZrMn_2$ alloy, the amount of the transferred hydrogen in $ZrMn_2Ca_{0.05}$ alloy of this Embodiment decreases little with the number of the cycles, stably maintaining the same transferred amount as observed immediately after the activation.

FIG. 13 further shows the rate of the hydrogen transfer rate in these alloys. In this Figure, the solid line represent the result for the $ZrMn_2Ca_{0.05}$ alloy of this invention, and the phantom line for the conventional $ZrMn_2$ alloy. The scale of the amount of the transferred hydrogen is the same as in FIG. 12. It can be seen in this Figure that in the case of 10 minute absorption cycles only 60% of the hydrogen can be transferred in the conventional $ZrMn_2$ alloy, in contrast to $ZrMn_2Ca_{0.05}$ alloy of this Embodiment in which 96% can still be transferred, indicating that the hydrogen absorption has been substantially completed therein. To note, similar results have been obtained also for the hydrogen desorption.

It would be understood from this Figure that the decrease in the amount of the hydrogen transferred in the the conventional $ZrMn_2$ alloy is due to the decrease in hydrogen transfer rate.

Embodiment 8

For the purpose of comparison the alloys of the invention with the conventional alloys, a further study similar to that in the Embodiment 7 was conducted on the properties of the $Zr_{0.8}Ti_{0.2} Mn_2Ca_{0.05}$ and $ZrMn_{1.6}Fe_{0.4}Ca_{0.05}$ alloys formed from the known multicomponent alloys $Zr_{0.8} Ti_{0.2}Mn_2$ and $ZrMn_{1.6}Fe_{0.4}$, respectively, by adding thereto Ca. The multicomponent alloys had been formed from $ZrMn_2$ by substituting a part of the constituent element Zr and Mn by some other element. A part of the results are listed in Table 5.

TABLE 5

| Alloys | Amount of hydrogen transferred after 100 cycles (ratio to the hydrogen transferred immediately after the activation) | Comment |
|---|---|---|
| $Zr_{0.8}Ti_{0.2}Mn_2$ | 0.80 | conventional |
| $Zr_{0.8}Ti_{0.2}Mn_2Ca_{0.05}$ | 0.96 | this invention |
| $Zr Mn_{1.6}Fe_{0.4}$ | 0.65 | conventional |
| $Zr Mn_{1.6}Fe_{0.4}Ca_{0.05}$ | 0.93 | this invention |

As is clearly seen in Table 5, in sharp contrast to the conventional $Zr_{0.8}Ti_{0.2} Mn_2$ and $Zr Mn_{1.6}Fe_{0.4}$ alloys formed from $ZrMn_2$ alloy by partial substitution of Ti and Fe for Zr and Mn, the amounts of the transferred hydrogen change little after 100 cycles and amount to more than 90% of the initially transferred hydrogen, as in Embodiment 7, in the case of $Zr_{0.8}Ti_{0.2} Mn_2Ca_{0.05}$ and $Zr Mn_{1.6}Fe_{0.4}Ca_{0.05}$ alloys according to this Embodiment, which are obtained by adding Ca to the conventional $Zr_{0.8}Ti_{0.2} Mn_2$ and $Zr Mn_{1.6}Fe_{0.4}$ alloys.

We note that similar results have been obtained for the alloys containing Mg, La, Mm, and the mixture of these elements as additives.

Embodiment 9

A still further study was made on the amount of the hydrogen transferred and the hydrogen transfer rate of in the Zr-Mn-Co-Al alloy described in aforementioned Embodiments 1-3, and the alloys formed therefrom by adding Ca, Mg, La, and Mm, the results of which are summarized in Table 6 and in FIGS. 14 and 15.

TABLE 6

| Alloys | Amount of hydrogen transferred after 100 cycles (ratio to the hydrogen transferred immediately after the acitivation) | Comment |
|---|---|---|
| $ZrMn_{1.45}Co_{0.55}Al_{0.075}$ | 0.42 | conventional |
| $ZrMn_{1.45}Co_{0.55}Al_{0.075}Ca_{0.05}$ | 0.96 | this invention |
| $ZrMn_{1.45}Co_{0.55}Al_{0.075}Mg_{0.05}$ | 0.80 | this invention |
| $ZrMn_{1.45}Co_{0.55}Al_{0.075}La_{0.05}$ | 0.96 | this invention |
| $ZrMn_{1.45}Co_{0.55}Al_{0.075}Mm_{0.05}$ | 0.96 | this invention |

From what is described in connection with the Embodiments 1-3 and Table 6, FIGS. 14 and 15, the following conclusions obtain.

Namely, the Zr-Mn-Co-Al alloys of this invention formed from the conventional Zr-Mn alloys by partially substituting Co for Mn and by adding Al thereto have reduced differences between the hydrogen absorption and desorption pressures so that the alloys can undergo hydrogen absorption and desorption under small pressure differences. Furthermore, those alloys formed from them by further adding Ca, Mg, and rare earth (La, Mm) exhibit significant improvement in the amount of transferred hydrogen as well as in transfer velocities It should be pointed out that, while the conventional hydrogen absorbing alloys when taken out of the reactors after 100 cycles were found sintered and coagulation, the alloys containing Ca, Mg, and rare earth as additives according to the invention still maintained fluidity in each of the Embodiments. Thus, the hydrogen absorbing alloys of this invention are free of deterioration in hydrogen transfer rate due to coagulation and invariably maintain the capability of hydrogen absorption and desorption.

It has been found also that the most of the aforementioned alloys of the Embodiments tend to loose the reaction rate and the hydrogen transfer rate when they are added to more than 5 wt % of Ca, Mg, and rare earth, so that it is preferable to add such elements by at most 5 wt %.

We claim:

1. Hydrogen absorbing $ZrMn_2$ alloys having $MgZn_2$-type Laves phase structure with its Mn partially substituted by Co and containing Al as an additive and having the composition $Zr(Mn_{1-x}Co_x)_y Al_z$, where y is from about 1.7 to 2.3, x is from 0 to about 0.5, and z is from 0 to about 0.15.

2. Hydrogen absorbing alloys of claim 1 further containing at least one rare earth element.

3. Hydrogen absorbing $ZrMn_2$ alloys having $MgZn_2$-type Laves phase structure with its Mn partially substituted by Co and its Zr partially substituted by Ti, and containing Al as an additive and having the composition $Zr_{1-w} Ti_w (Mn_{1-x}Co_x)_y Al_z$, where y is from about 1.7 to 2.3, w is from 0 to about 0.5, x is from 0 to about 0.5, and z if from 0 to about 0.15.

4. Hydrogen absorbing alloys of claim 3 further containing at least one rare earth element.

5. Hydrogen absorbing $ZrMn_2$ alloys having $MgZn_2$-type Laves phase structure further containing at least one of Ca and Mg.

6. Hydrogen absorbing alloys as set forth in claim 5 characterized in that the added amount(s) of the rare earth, Ca, or(and) Mg is(are) not more than 5 wt %.

7. A multicomponent alloy containing Zr and Mn and having $MgZn_2$-type Laves phase structure and further containing at least one of Ca and Mg.

8. Multicomponent alloys as set forth in claim 7 characterized in that Al is added to said multicomponent alloy.

* * * * *